(12) United States Patent
Kurihara

(10) Patent No.: US 7,265,862 B2
(45) Date of Patent: Sep. 4, 2007

(54) INFORMATION PROCESSING APPARATUS FOR COLOR PRINTER AND METHOD OF CONTROLLING SAME

(75) Inventor: Shukei Kurihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 10/844,410

(22) Filed: May 13, 2004

(65) Prior Publication Data

US 2004/0207860 A1    Oct. 21, 2004

Related U.S. Application Data

(63) Continuation of application No. PCT/JP2004/001391, filed on Feb. 10, 2004.

(30) Foreign Application Priority Data

Feb. 12, 2003    (JP) ............................. 2003-034344

(51) Int. Cl.
*G06F 15/00* (2006.01)
*G06F 3/12* (2006.01)
(52) U.S. Cl. .................... 358/1.15; 358/1.9
(58) Field of Classification Search ............... 358/1.1, 358/1.6, 1.9, 1.13, 1.15, 521, 518, 517, 1.2
See application file for complete search history.

(56) References Cited

U.S. PATENT DOCUMENTS

| | | | |
|---|---|---|---|
| 5,490,237 A | 2/1996 | Zimmerman et al. ........ | 395/115 |
| 5,971,582 A * | 10/1999 | Fuji ............................. | 700/90 |
| 6,369,913 B2 * | 4/2002 | Aoyagi et al. ............... | 358/1.9 |
| 6,424,739 B1 * | 7/2002 | Ukita et al. .................. | 382/166 |
| 6,894,792 B1 * | 5/2005 | Abe ............................ | 358/1.15 |

FOREIGN PATENT DOCUMENTS

| | | |
|---|---|---|
| JP | 6-320806 A | 11/1994 |
| JP | 2001-142670 A | 5/2001 |
| JP | 2002-172821 A | 6/2002 |
| JP | 2002-373069 A | 12/2002 |

* cited by examiner

*Primary Examiner*—Gabriel Garcia
(74) *Attorney, Agent, or Firm*—Fitzpatrick, Cella, Harper & Scinto

(57) ABSTRACT

An information processing apparatus which can obtain a normal print result even for print data of a plurality of color planes. A host computer connected to a printer for outputting color print data, is characterized by a unit adapted to calculate the data sizes of respective color data which form one page of color print data to be output by the printer, a unit adapted to determine a timing, at which a print start instruction is to be issued to the output apparatus, on the basis of the calculated data sizes of respective color data, and a plane transfer size as a data size that can be transferred to the printer during output of one page per color data, and a unit adapted to issue a print start instruction to the printer at the determined timing after the color print data to be output is transferred to the printer.

20 Claims, 10 Drawing Sheets

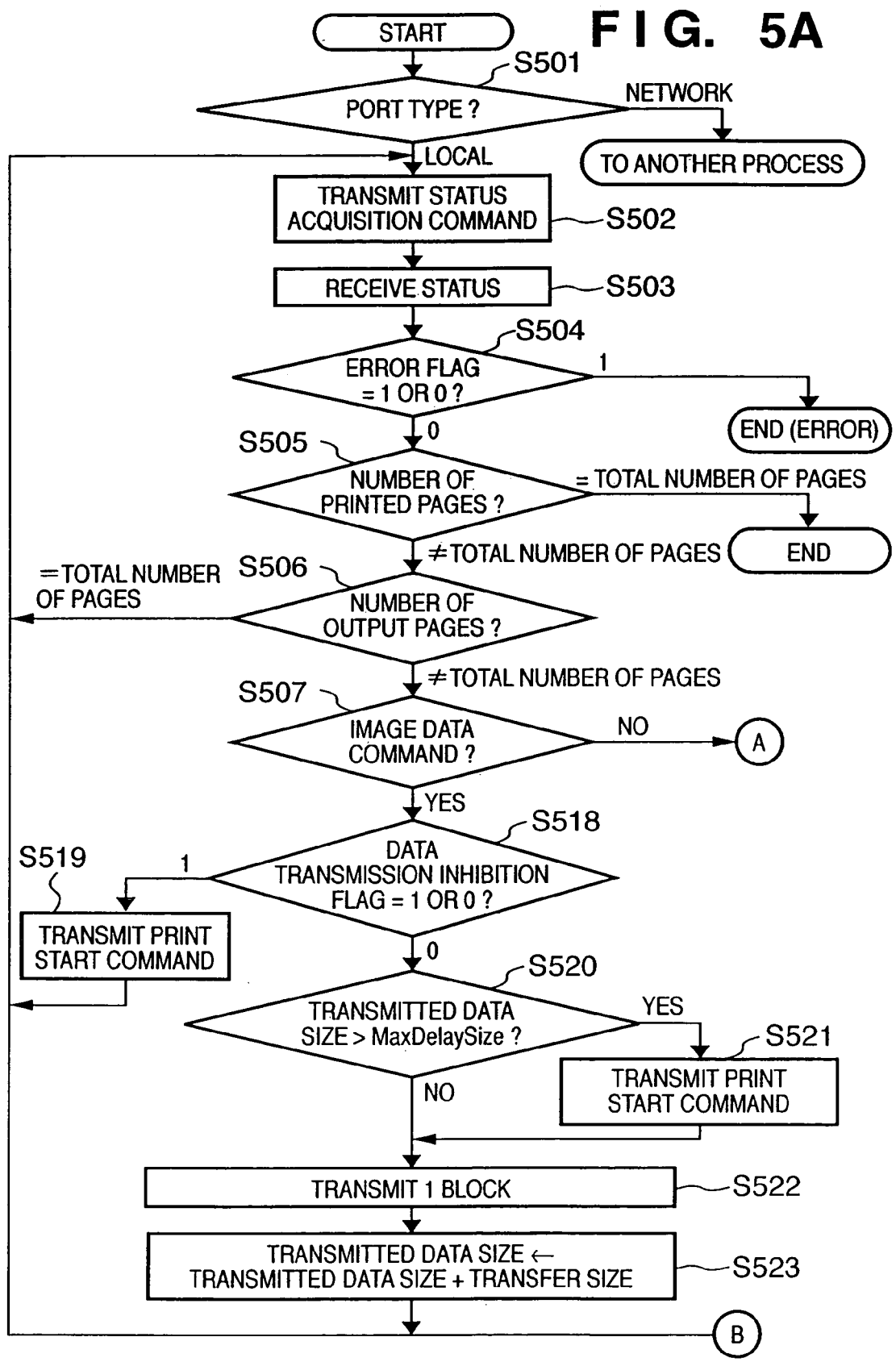

US 7,265,862 B2

INFORMATION PROCESSING APPARATUS FOR COLOR PRINTER AND METHOD OF CONTROLLING SAME

RELATED APPLICATION

This application is a continuation under 35 U.S.C. § 120 of International Application No. PCT/JP2004/001391, filed Feb. 10, 2004, which designates the United States and which claims benefit of priority of Japanese Application No. 2003-034344, filed Feb. 12, 2003.

TECHNICAL FIELD

The present invention relates to an information processing apparatus which is connected to an output unit that can output data and, more particularly, to a print process that derives a print start instruction of the output unit at an appropriate timing.

BACKGROUND ART

As a conventional print method for a page printer such as a laser beam printer, which prints print data received from a host computer, a method of issuing a print start instruction simultaneously with reception of print data and printing print data while receiving the print data so as to reduce a required memory size is known. However, in a page printer, a time period per page from the start to the end of a print process of an engine is set to be constant. If full print data cannot be received before the print end timing, a normal print result cannot be obtained. Therefore, when an interface that connects a host computer and printer is not sufficiently fast, if print data that forms one page has a large size, full print data that forms one page cannot be received from a print start instruction until the print end timing, and a normal print result cannot be obtained.

In order to solve such problem, for example, Japanese Patent Laid-Open No. 06-320806 discloses the following technique. That is, upon reception of a "sleek transfer page" command by a printer that has received print data, a header field is processed, and a RAM area assigned as a buffer is set to serve as an I/O buffer in accordance with a threshold value in the header. When raster image data that meets the threshold value is buffered, a print engine 34 is enabled to start a print process. According to this reference, the threshold value set in the host computer is determined in accordance with the known print speed of the laser print engine and an expected transfer rate of a standard I/O.

Also, Japanese Patent Laid-Open No. 2001-142670 discloses the following technique. That is, an engine starts a print process after data of a given size is transferred to a printer on the basis of an image data size that considers the compression ratio of image data, and the transfer rate of an interface, and the engine continues the print process while receiving transferred data.

However, even with either of the above prior arts, when print data is color data (having a plurality of color planes), a normal print result cannot often be obtained depending on data. That is, in case of color print data, an engine prints respective color planes on a transfer member in a predetermined order. For this reason, even when the data size of print data is relatively not so large as a whole, if an arbitrary color plane has a large data size, print data of that color plane cannot be received within a predetermined time period upon printing that color plane, resulting in a print error (i.e., a time period from the start to the end of a print process cannot fall within a predetermined period of time).

DISCLOSURE OF INVENTION

The present invention has been made in consideration of the above problems, and has as its object to allow an information processing apparatus, which is connected to an output unit for making output processes of print data of a plurality of color planes, to obtain a normal print result of even print data of a plurality of color planes by issuing a print start instruction at an appropriate timing that considers a print data size for each color plane.

In order to achieve the above object, an information processing apparatus according to the present invention comprises the following arrangement. That is, there is provided an information processing apparatus which is connected to an output unit that outputs color print data, comprising:

calculation unit adapted to calculate data sizes of respective color data which form one page of color print data to be output by the output unit;

determination unit adapted to determine a timing, at which a print start instruction is to be issued to the output unit, on the basis of the calculated data sizes of respective color data, and a plane transfer size as a data size that can be transferred to the output unit during output of one page per color data; and instruction transmission unit to adapted to issue a print start instruction to the output unit at the determined timing after the color print data to be output is transferred to the output unit.

Other features and advantages of the present invention will be apparent from the following description taken in conjunction with the accompanying drawings.

BRIEF DESCRIPTION OF DRAWINGS

The features and advantages of the present invention will be sufficiently understood by reading a detailed description of preferred embodiments together with the following accompanying drawings.

FIGS. 5A and 5B are flow charts showing the flow of a print process in the transmission program of the information processing apparatus according to the embodiment of the present invention;

BEST MODE FOR CARRYING OUT THE INVENTION

One Embodiment

Preferred embodiments of the present invention will now be described in detail in accordance with the accompanying drawings. The present invention allows a printer, which comprises at least a memory for storing print data received from, for example, a host computer, and print unit adapted to render print data stored in the memory to a dot image, and printing out the dot image, to execute a print process as fast as possible.

Figure 1:
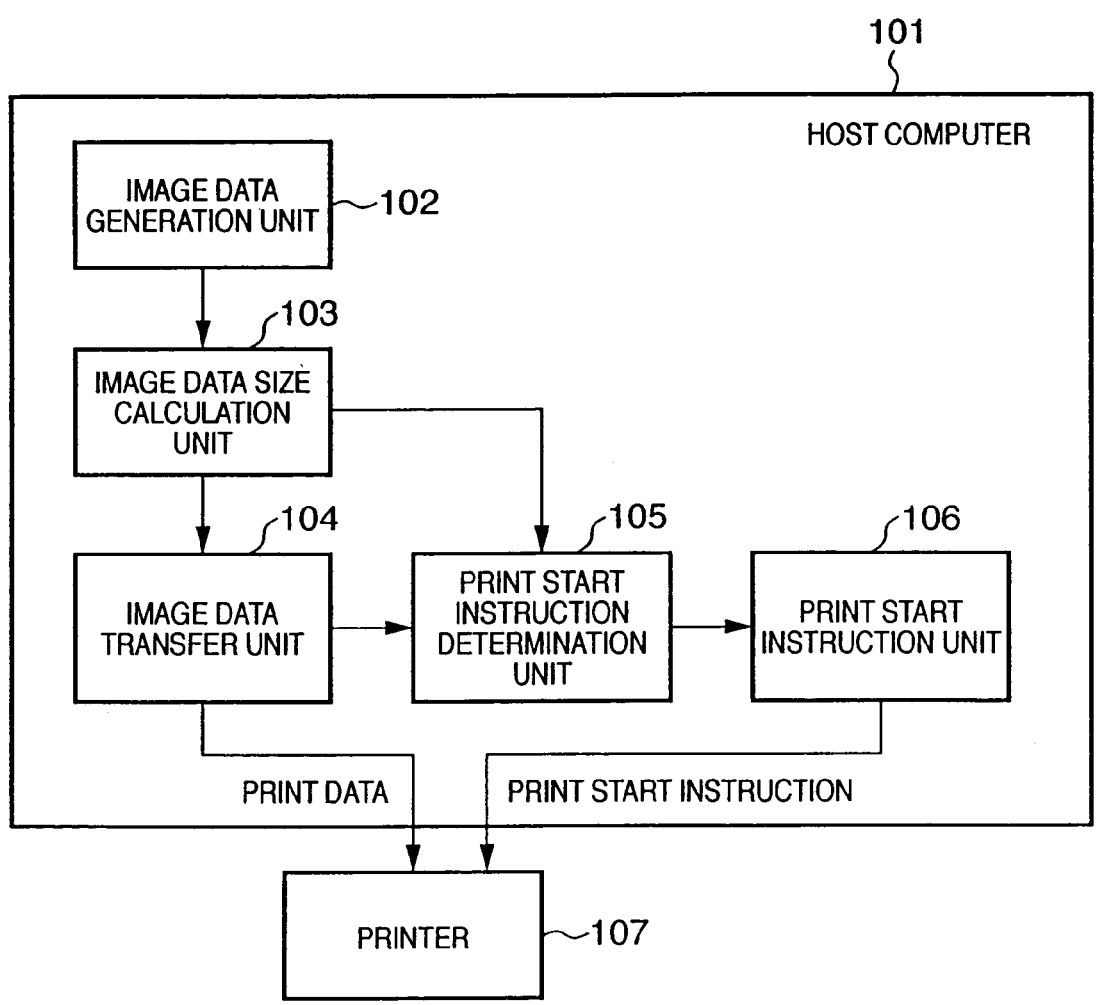
FIG. 1 is a block diagram showing the system arrangement of a print processing system which comprises an information processing apparatus according to an embodiment of the present invention.

FIG. 1 is a block diagram showing the entire print system which comprises an information processing apparatus according to an embodiment of the present invention. Reference numeral 102 denotes an image data generation unit which generates image data based on data received from an application (not shown). Reference numeral 103 denotes an image data calculation unit which determines if image data is monochrome or color data, and calculates the data sizes of respective color planes. Reference numeral 104 denotes an image data transfer unit which transfers image data received from the image data calculation unit 103 to a printer (note that data to be transferred to a printer 107 of image data generated by a host computer 101 will be referred to as "print data" hereinafter; the same applies to the following description). Reference numeral 105 denotes a print start instruction determination unit, which receives an image data type (color or monochrome) and the data size or sizes of image data from the image data size calculation unit 103, and also the transfer rate of print data from the image data transfer unit 104, and determines an appropriate print start instruction timing based on these data. Reference numeral 106 denotes a print start instruction unit which monitors the data size of print data transferred from the image data transfer unit 104 to the printer 107, and issues a print start instruction to the printer 107 on the basis of the appropriate print start instruction timing determined by the print start instruction determination unit 105.

Figure 2:
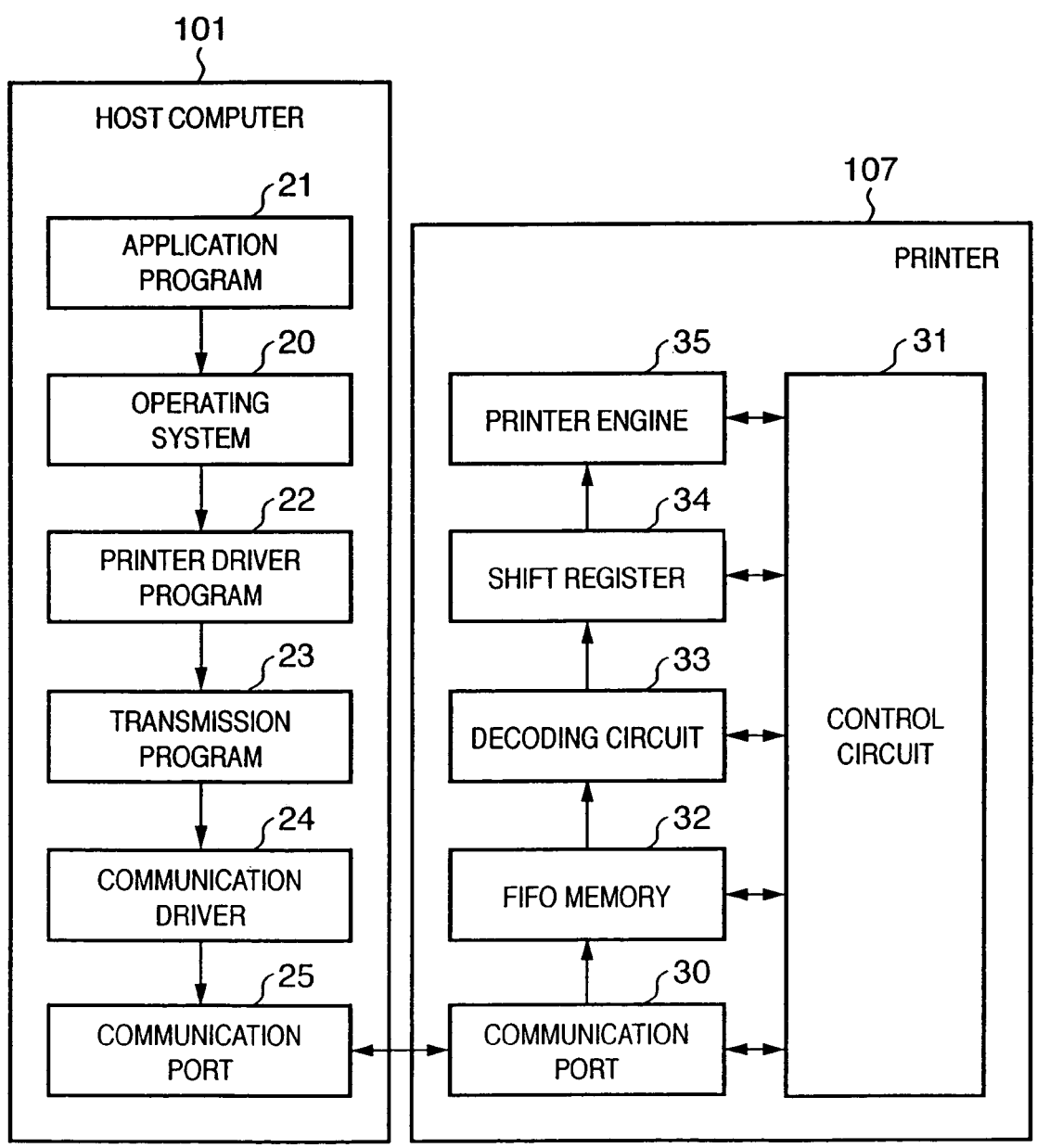
FIG. 2 is a block diagram for explaining the arrangement of the print processing system which comprises the information processing apparatus according to the embodiment of the present invention.

FIG. 2 is a block diagram showing the arrangement associated with a communication control unit in the print system shown in FIG. 1. The arrangement associated with communication control of the host computer 101 will be explained first.

An operating system (OS) 20 manages hardware such as a CPU, memory, hard disk, communication port 25, and the like, and also manages software such as an application program 21, printer driver program 22, transmission program 23, communication driver 24, and the like.

The application program 21 creates image data in accordance with operator's instructions, and sends image data to the printer driver program 22 via the operating system 20, thus issuing a print command.

The printer driver program 22 generates image data to be printed by the printer 107 on the basis of the print command issued by the application program 21. Assume that a compression process is applied to this image data. The compression process of image data may be done by the printer driver program 22, a compression module independent from the printer driver program 22, or the communication program 23.

Image data generated by the printer driver program 22 has a plurality of pages having similar configurations. Each page consists of one page start command, one image data start command, one or more image data commands, and one page end command.

The page start command designates information required to control a print process such as a paper size, a width and height of image data, an image data size, and the like. The image data command designates a block to be printed (image data which is generated according to the print command issued by the application program 21 has been segmented into blocks each having a size of 32 KB or less after compression). The page end command designates the end of print data of one page.

The transmission program 23 transmits image data generated by the printer driver program 22 to the printer 107 as print data via the communication driver 24 and communication port 25 in accordance with print status acquired from the printer 107 in a sequence to be described later. The communication driver 24 controls the communication port in accordance with a request from the transmission program so as to exchange data with the printer 107.

The arrangement associated with communication control of the printer 107 will be described below. A communication port 30 is connected to the communication port 25 of the host computer 101 via, for example, a parallel interface cable. Of course, connection may be attained via a network.

A control circuit 31 comprises, for example, a ROM, RAM, and 1-chip CPU that incorporates a timer. The control circuit 31 controls the communication port 30, a FIFO memory 32, a decoding circuit 33, a shift register 34, and its internal timer, and transmits engine commands to and receives engine status signals from a printer engine 35 using serial signals.

The FIFO (first-in, first-out) memory 32 has a capacity of, for example, 0.5 MB, stores print data received by the communication port 30, and outputs the stored print data to the decoding circuit 33 in a FIFO order. The FIFO memory 32 outputs a signal indicating if it has a free space to the control circuit 31.

The decoding circuit 33 decodes print data stored in the FIFO memory 32, and outputs decoded data to the shift register 34.

When the shift register 34 receives a main scan start signal from the printer engine 35, it converts parallel data output from the decoding circuit 33 into serial data, and outputs the serial data to the printer engine 35.

The printer engine 35 comprises a laser beam printer engine, which receives engine commands from and transmits engine status signals to the control circuit 31 using serial signals. Upon reception of a PRINT command from the control circuit 31, the printer engine 35 starts a print process for one page. When a paper sheet has reached a predetermined position where a main scan is to start, the printer engine 35 outputs a main scan start signal to the shift register 34, and executes a print process according to serial data output from the shift register 34.

The printer 107 that prints print data received from the host computer 101 often issues a print start instruction simultaneously with reception of print data so as to improve the throughput. However, when the print data size is large and transfer is not completed within a given period of time, a normal print result cannot be obtained. At this time, whether or not a normal print result can be obtained is determined only after an actual print process is made, thus wasting toner and print sheets. Conversely, a print start instruction is often issued after print data transfer is complete, so as to obtain a normal print result. However, in such a case, the throughput lowers needlessly.

As one solution of such problem, a method of transferring a data size calculated based on print data and the transfer rate of an interface in advance to a printer main body, and then starting a print process may be used. As described above, according to this method, when print data is color data, and when the total data size is not large but only the data size of a given color plane is large, a normal print result cannot be obtained. That is, it is determined in the conventional method that no problem is posed if a print process starts at an early timing since the print data size is not large. Upon printing a plane with a large data size, the time period from the start to the end of the print process cannot fall within a predetermined period of time, resulting in a print error.

Hence, details of the print process in a host computer which is connected to an output apparatus that outputs color print data, and can issue a print start instruction to a printer at an appropriate timing on the basis of image data sizes of respective colors which are generated based on a rendering command supplied via the OS and a plane transfer size which can be transferred while the printer processes print data of a predetermined color for one page, will be described below.

FIGS. 3, 4, 5A, and 5B are flow charts showing the operation of the host computer (information processing apparatus) according to this embodiment. In practice, the processes of these flow charts are implemented by the transmission program 23 or collaboration of the communication driver 24 and printer driver program 22 of the host computer 101. In an actual print process, the processes are done in the order of FIGS. 3, 4, 5A, and 5B.

Figure 3:
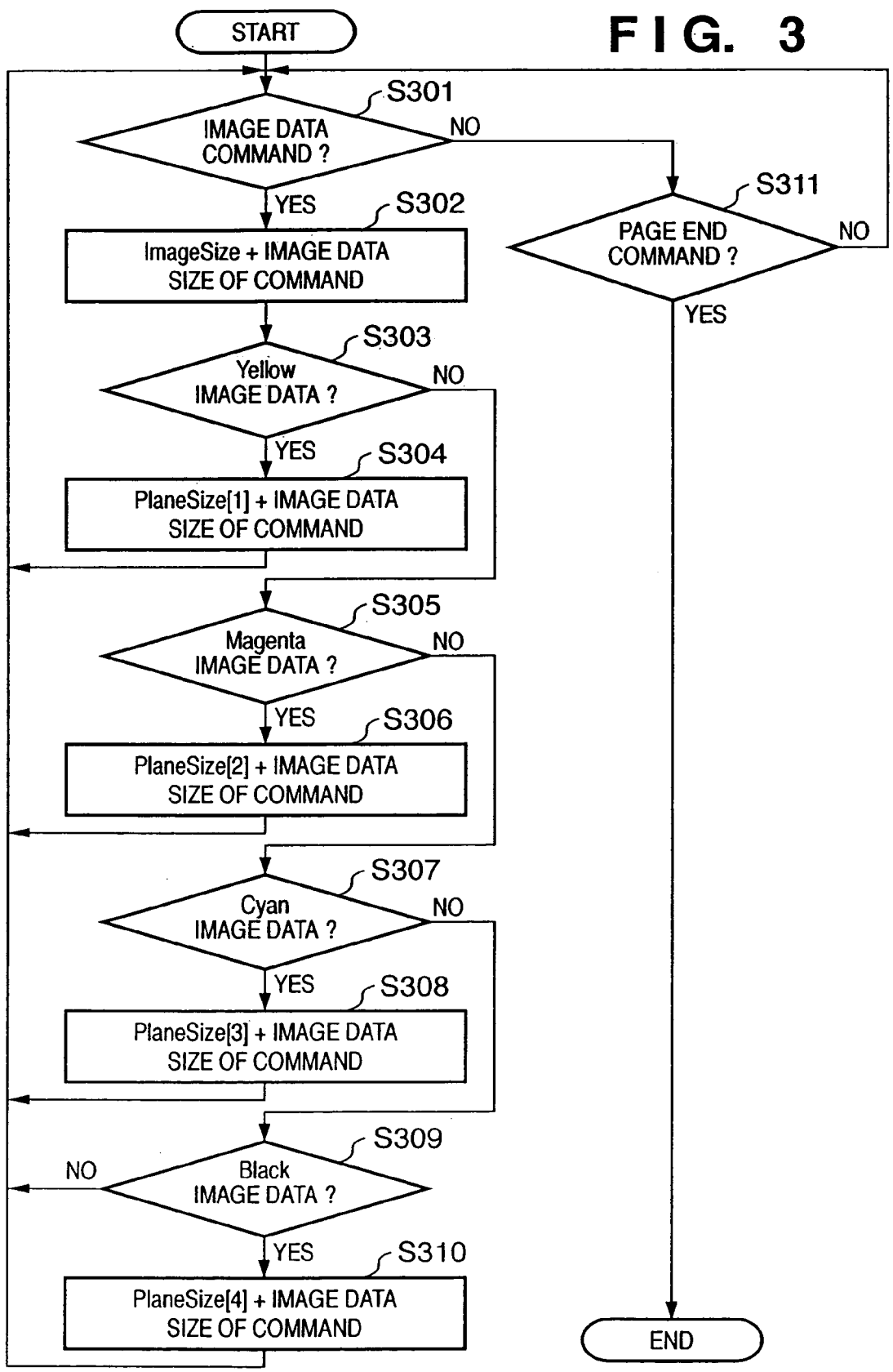
FIG. 3 is a flow chart showing the flow of a process required to calculate an image data size in a transmission program of the information processing apparatus according to the embodiment of the present invention.

FIG. 3 is a flow chart showing a process for calculating a data size from image data. This process is implemented by the image data calculation unit 103 in FIG. 1. ImageSize and PlaneSize[1] to PlaneSize[4] are initialized to zero. Upon reception of image data, the transmission program 23 checks in step S301 if a received command is an image data command. If the received command is an image data command, the flow advances to step S302; otherwise, the flow advances to step S311.

In step S302, the data size of that image data command is added to ImageSize. Since the sizes of all image data commands are added to ImageSize, ImageSize indicates the size of image data of that page. It is checked in step S303 if image data is Yellow image data. If image data is Yellow image data, the flow advances to step S304; otherwise, the flow jumps to step S305.

In step S304, the data size is added to PlaneSize[1]. Suffices of PlaneSize indicate the order of planes upon printing (the order in which color planes are transferred to the transfer member). In this embodiment, print processes are done on the transfer member in the order of Yellow, Magenta, Cyan, and Black planes, unless otherwise specified.

It is checked in step S305 if image data is Magenta image data. If image data is Magenta image data, the flow advances to step S306; otherwise, the flow jumps to step S307. In step S306, the data size is added to PlaneSize[2].

It is checked in step S307 if image data is Cyan image data. If image data is Cyan image data, the flow advances to step S308; otherwise, the flow jumps to step S309. In step S308, the data size is added to PlaneSize[3].

It is checked in step S309 if image data is Black image data. If image data is Black image data, the flow advances to step S310; otherwise, the flow returns to step S301. It is checked in step S311 if the received command is a page end command. If the received command is not a page end command, the flow returns to step S301 to process the next command. If the received command is a page end command, it is determined that the data sizes of the page of interest have been calculated, thus ending the process.

Figure 4:
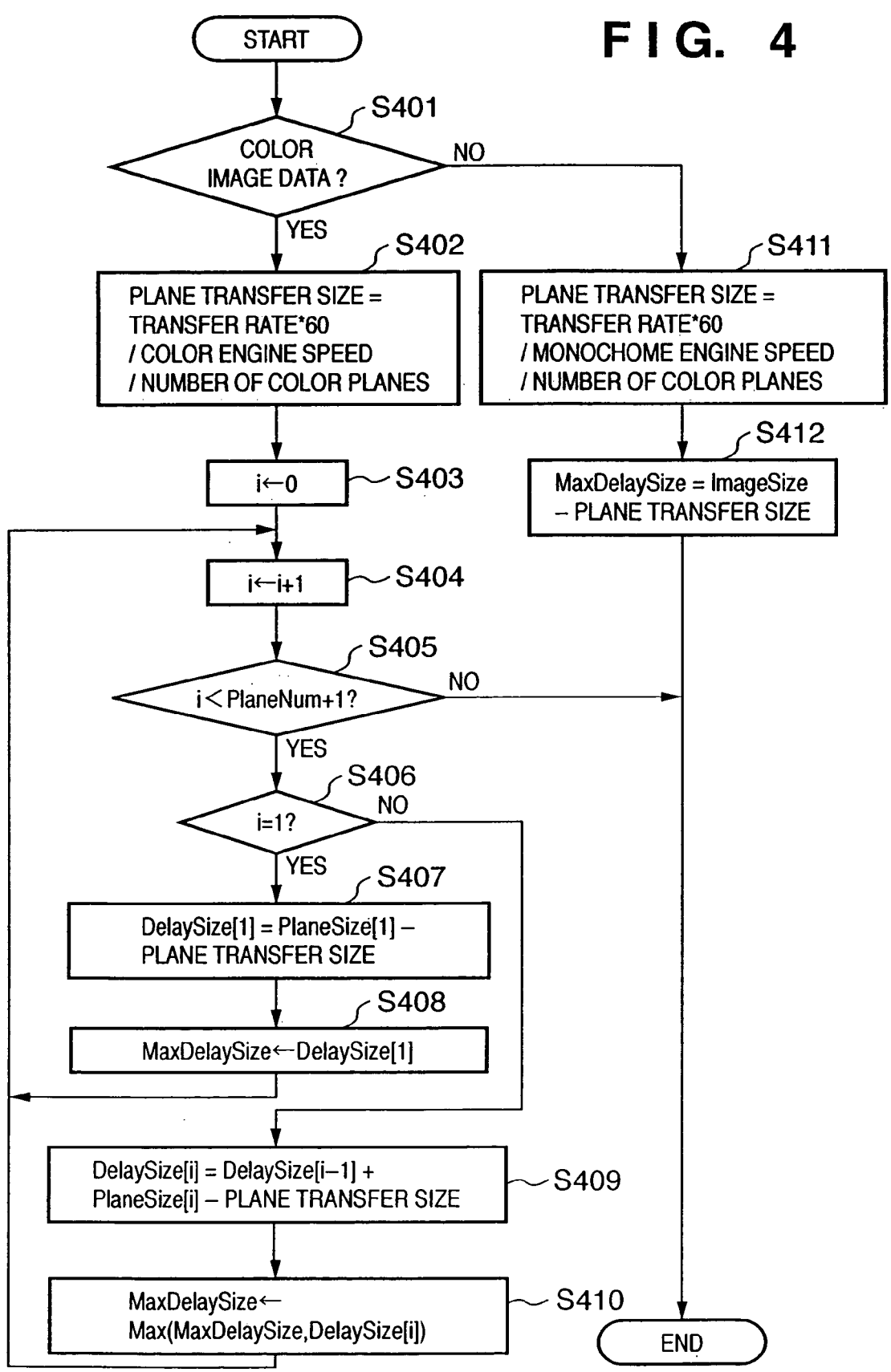
FIG. 4 is a flow chart showing the flow of a process required to calculate a delay transfer size in the transmission program of the information processing apparatus according to the embodiment of the present invention.

FIG. 4 is a flow chart showing a process for determining a delay image data size (MaxDelaySize) from the difference between the total data size calculated by the process in FIG. 3 and a plane transfer size in case of monochrome data, or the maximum one of the sums each of which is calculated by adding the difference between the image data size of a predetermined color to be transferred of respective colors and the plane transfer size, and the difference between the image data size of another color to be transmitted previously and the plane transfer size in case of color data. The flow chart shown in FIG. 4 is executed by the print start instruction determination unit 105 in FIG. 1.

Assume that a transfer rate is 750 KB/sec as an average rate of an LPT port and USB port which are prevalently used now. A high-speed interface such as Hi-Speed (60 MB/S) of USB2.0 or the like may be used in connection. Since transfer of image data itself is completed within several hundred msec, no problem is posed if transfer is made at such transfer rate. Since the transmission program recognizes an engine for which that program is used, the number of color planes=4 (PlaneNum=4) is known.

MaxDelaySize and DelaySize[1] to DelaySize[4] are initialized to zero. DelaySize[i] stores a data size that must be transmitted to the printer before the start of a print process (to be referred to as a "delay transfer size" hereinafter).

It is checked in step S401 if received image data is color image data. Whether or not received image data is color image data is determined by checking a flag set in the received data in the transmission program. If the received image data is color image data, the flow advances to step S402; if the received image data is monochrome image data, the flow advances to step S411.

In step S402, a plane transfer size as a data size that can be transferred until a print process of one of color planes is completed on the transfer medium in the printer is calculated on the basis of the transfer rate, an engine speed, and a time period required to print one plane. For example, if the engine speed is 4 ppm for color and the number of color planes is 4, the time period required to print one plane is calculated by dividing 4 (ppm) by 4 (colors) and multiplying the quotient by 60, that is, 60 sec/4 (ppm)/4 (the number of colors). Hence, the plane transfer size is calculated by:

Plane transfer size=transfer rate (750 KB/sec)*60/4/4

In step S403, variable i used in the process is initialized to zero. In step S404, i is incremented to execute a process in the order of planes to be printed.

It is checked in step S405 if i≦PlaneNum (=4). If i≦PlaneNum, since planes to be processed still remain, the flow advances to step S406. If i>PlaneNum, it is determined that all planes have been processed, thus ending the process.

It is checked in step S406 if i=1. If i=1, it is determined the first color plane is to be processed, and the flow advances to step S407. If i≠1, the flow jumps to step S409.

In step S407, the difference between PlaneSize[1] (Yellow image data size in this embodiment) and the plane transfer size is substituted in DelaySize[1]. That is, if the image data size is larger than the plane transfer size, since transfer of print data may not often be completed during the print process, such data must be transferred beforehand. A value obtained by subtracting the plane transfer size from the data size of the color plane of interest is held in DelaySize[1] as the delay transfer size of the first plane (Yellow). When the plane transfer size is larger than PlaneSize[1], DelaySize[1] holds a negative value.

In step S408, DelaySize[1] is substituted in MaxDelaySize.

On the other hand, in step S409 the delay transfer sizes of the second and subsequent planes (Magenta, Cyan, Black) are calculated. As for the second and subsequent planes, if the data size of the previous color plane is smaller than the plane transfer size, data of the next color plane can be transferred during the print process of the previous color plane; otherwise, since the transfer timing must be further delayed, the delay transfer size DelaySize[i-1] of the previous plane must be added to that of the plane of interest. In step S410, MaxDelaySize at that time is compared with DelaySize[i], and a larger one of these values is substituted in the delay image data size (MaxDelaySize).

In case of monochrome print, the plane transfer size is calculated in step S411 in the same manner as in step S402. In case of monochrome data, the number of color planes is 1. Since there is only one color, a value obtained by subtracting the plane transfer size from the image data size of that page becomes the delay transfer size. Hence, that value is set in MaxDelaySize in step S412.

Figure 5B:
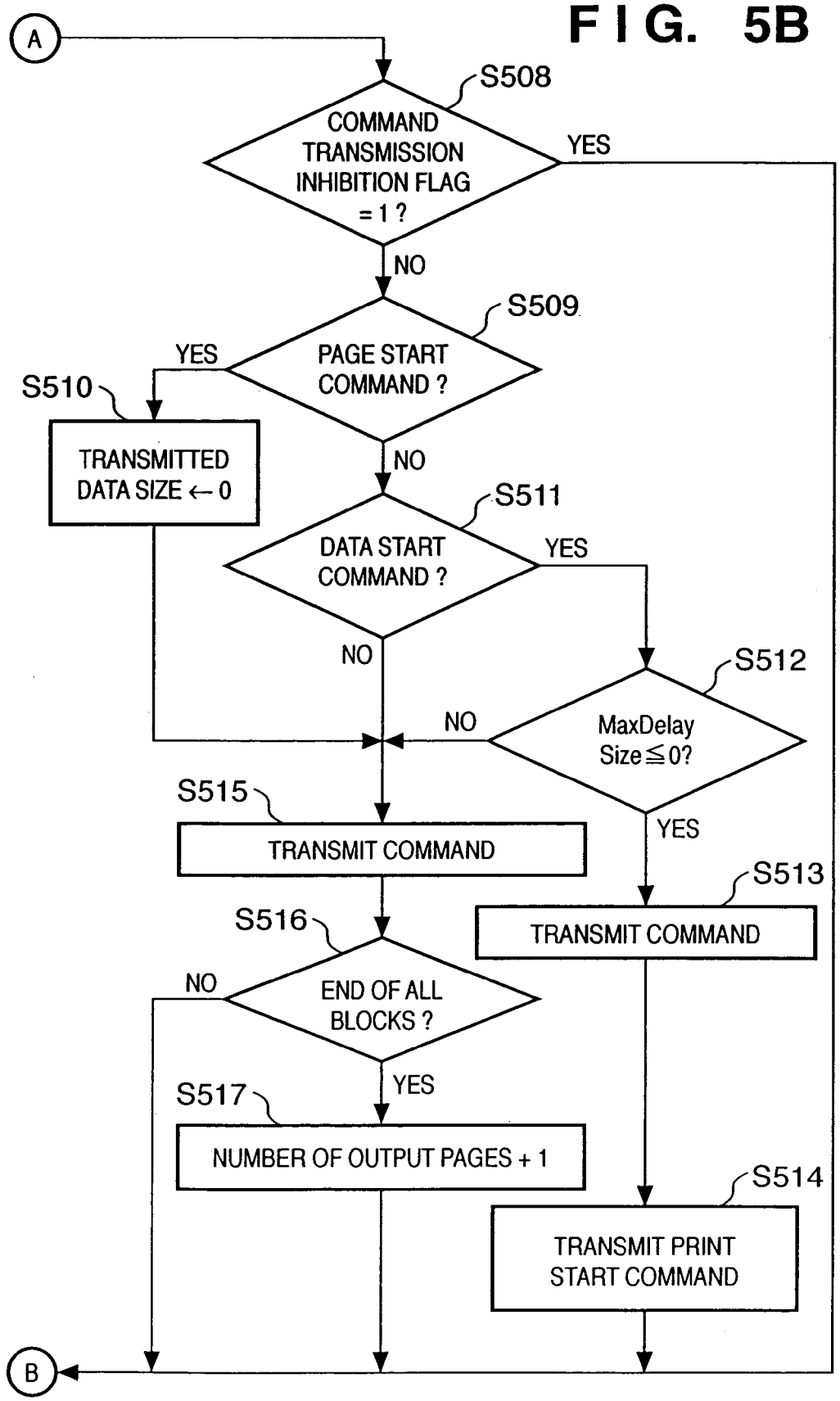

FIGS. 5A and 5B are flow charts showing the process executed when a print process is actually made using the delay image data size (MaxDelaySize) calculated in the process shown in FIG. 4. This process is executed by the image transfer unit 104 or the print start instruction unit 106 in FIG. 1, or the communication program in FIG. 2 for respective pages of color components. The transmission program 23 holds the number of output pages, the number of pages that have undergone data transmission, and the transmitted data size in a work area, and their initial values are zero.

In step S501, the port type is checked. The port type is checked based on, for example, a port name. If the port name includes LPT, USB, or the like, it is determined that the port type is "local"; otherwise, it is determined that the port type is "network". If the port type is "local", the flow advances to step S502; if the port type is "network", a print process is done by another process, thus ending the process. For example, as another process, a process which controls a memory of a network interface card equipped in the printer to receive all data and to execute a print process may be executed. Assume that the network interface card has a sufficiently large memory size.

If the port type indicates a port which corresponds to an interface with a stable data transfer rate, the processes in step S502 and subsequent steps are executed; if the port type indicates a port which corresponds to an interface with a data transfer rate that may dynamically vary, a process that controls the port to receive all image data to execute a print process is executed in place of the processes in step S502 and subsequent steps. In this way, a more stable system that can reduce the required memory size as a whole can be built.

In step S502, the printer 107 transmits a status acquisition command. Status is acquired to determine whether or not an error such as a paper jam, out-of-paper state, or the like has occurred in the printer, or whether or not a communication state between the host computer and printer is normal.

In step S503, status of the printer 107 is received. This step includes a process for monitoring whether or not the printer 107 operates normally. Note that status data includes an error flag, the number of printed pages, a command transmission inhibition flag, and a data transmission inhibition flag. The error flag indicates that an error has been detected during the print process of the printer 107. The number of printed pages indicates the number of pages that have been normally printed. The command transmission inhibition flag indicates that the printer 107 cannot receive a page start command and page end command. The data transmission inhibition flag indicates that the printer 107 cannot receive print data.

It is checked in step S504 if the error flag in the received status data is 1. If the error flag is 1, since a predetermined print error has occurred, the process ends (error). If the error flag is 0, the flow advances to step S505.

It is checked in step S505 if the number of printed pages in the received status data is equal to the total number of pages. If the number of printed pages is equal to the total number of pages, since all pages have been normally printed, the process ends normally. If the number of printed pages is not equal to the total number of pages, since all pages have not been normally printed, the flow advances to step S506.

It is checked in step S506 if the number of output pages is equal to the total number of pages. If the number of output pages is equal to the total number of pages, since all page data have been transmitted, the flow returns to step S502. If the number of output pages is not equal to the total number of pages, the flow advances to step S507.

It is checked in step S507 if a command to be transmitted is an image data command. If the command to be transmitted is not an image data command, the flow advances to step S508.

It is checked in step S508 if the command transmission inhibition flag in the received status data is 1. If the command transmission inhibition flag is 1, since transmission of commands other than an image data command is inhibited, the flow returns to step S502. If the command transmission inhibition flag is 0, since transmission of commands other than an image data command is permitted, the flow advances to step S509.

It is checked in step S509 if a command to be transmitted is a page start command. If it is determined that the command to be transmitted is a page start command, the flow advances to step S510.

In step S510, the transmitted data size is set to be zero, and the flow advances to step S515.

If it is determined in step S509 that the command to be transmitted is not a page start command, the flow advances to step S511. It is checked in step S511 if a command to be transmitted is a data start command. If it is determined that the command to be transmitted is a data start command, the flow advances to step S512; otherwise, the flow advances to step S515.

It is checked in step S512 if a print process is ready to start (If MaxDelaySize≦0, data need not be transferred in advance, and a print process is ready to start simultaneously with start of data). If it is determined that a print process can start, the flow advances to step S513. If it is determined that a print process is not ready to start, the flow advances to step S515. At the time of reception of a page start command, image data is not transferred yet. At this time, if the value stored in MaxDelaySize is equal to or smaller than 0, a print instruction can be issued before data transfer.

In step S513, a predetermined command (data start command) is transmitted. In step S514, a print start command is transmitted since it is determined in step S512 that a print process is ready to start.

In step S515, a predetermined command (page start command, page end command, or the like) is transmitted. It is checked in step S516 if all blocks of the currently output page have been transmitted. If blocks to be transmitted of the currently output page still remain, the flow returns to step S502. If all blocks of the currently output page have been transmitted, the flow advances to step S517 to increment the number of output pages by 1. The flow then returns to step S502.

If it is determined in step S507 that the command to be transmitted is an image data command, the flow advances to step S518. It is checked in step S518 if the data transmission inhibition flag in the received status data is 1. When a reception buffer becomes full of data, the printer sets the data transmission inhibition flag to be 1. If the data transmission inhibition flag is 1, since transmission of image data is inhibited, the flow advances to step S519. If the data transmission inhibition flag is 0, since transmission of image data is permitted, the flow advances to step S520.

It is checked in step S520 if a print process is ready to start. If the transmitted data size is larger than MaxDelaySize, which is calculated based on the data size of each color, the calculated data size of color data, and the plane transfer size as the data size that can be transferred to the output apparatus while each color data for one page is output, in accordance with the flow charts of FIGS. 3 and 4, it is determined that a print process is ready to start since data of the size that must be transferred before start of a print process has been transmitted. If it is determined that a print process is ready to start, the flow advances to step S521; otherwise, the flow advances to step S522.

If it is determined in step S518 that the data transmission inhibition flag is 1, the flow advances to step S519. Since the data transmission inhibition flag=1 means that the buffer on the printer side is already full of data at that time, no more image data can be transferred, thus transmitting a print start command. In step S522, image data for one block (predetermined size) is transmitted. Transmission of image data for one block (predetermined size) in step S522 can fully utilize a memory of the printer if that memory has a small capacity.

In step S523, the size of the image data transmitted in step S522 is added to the transmitted data size. By repeating the processes from step S502 to step S523, image data for a size equal to or larger than MaxDelaySize is transmitted in advance. Also, transfer of image data for one block may be repeated by the process in step S522. Alternatively, the process of step S522 may be modified to transmit image data for a size equal to or larger than MaxDelaySize in advance.

As described above, the image data size calculation unit 103 calculates the image data sizes of respective colors in accordance with the flow chart shown in FIG. 3, the print start instruction determination unit 105 calculates MaxDelaySize in accordance with the flow chart shown in FIG. 4, and the print start instruction unit 106 or the like transmits a print start instruction to the printer 107 at a timing determined based on the flow charts shown in FIGS. 5A and 5B. In this way, a time period required from the start to the end of a print process can be set to be constant. Hence, the problem that full image data which form one page cannot be received during the period from the start to the end of the print process by the engine can be avoided.

Practical embodiments (embodiments 1 to 3) will be described hereinafter based on the aforementioned embodiment (the arrangement in FIG. 1 and the flow charts of FIG. 2 and the like) so as to clarify the features of the print processing method of the present invention.

Embodiment 1

An example of the aforementioned embodiment of the present invention will be described below. In this embodiment, let Tp be the time required for the printer to print per plane, and D be the data transfer rate. Also, the plane transfer size (i.e., Tp×D)=100 (note that a description of units will be omitted hereinafter for the sake of simplicity).

Also, image data is made up of four colors Yellow, Magenta, Cyan, and Black, these data are printed in this plane order, and the respective plane sizes are:

PlaneSize[1] (=Yellow)=160
PlaneSize[2] (=Magenta)=90
PlaneSize[3] (=Cyan)=90
PlaneSize[4] (=Black)=60

Note that a description of this embodiment will be given while comparing a case wherein a print process is done at a print start instruction timing obtained by the conventional print processing method, and a case wherein a print process is done at a print start instruction timing obtained by the print processing method according to the embodiment of the present invention, under the aforementioned preconditions.

Figure 6:
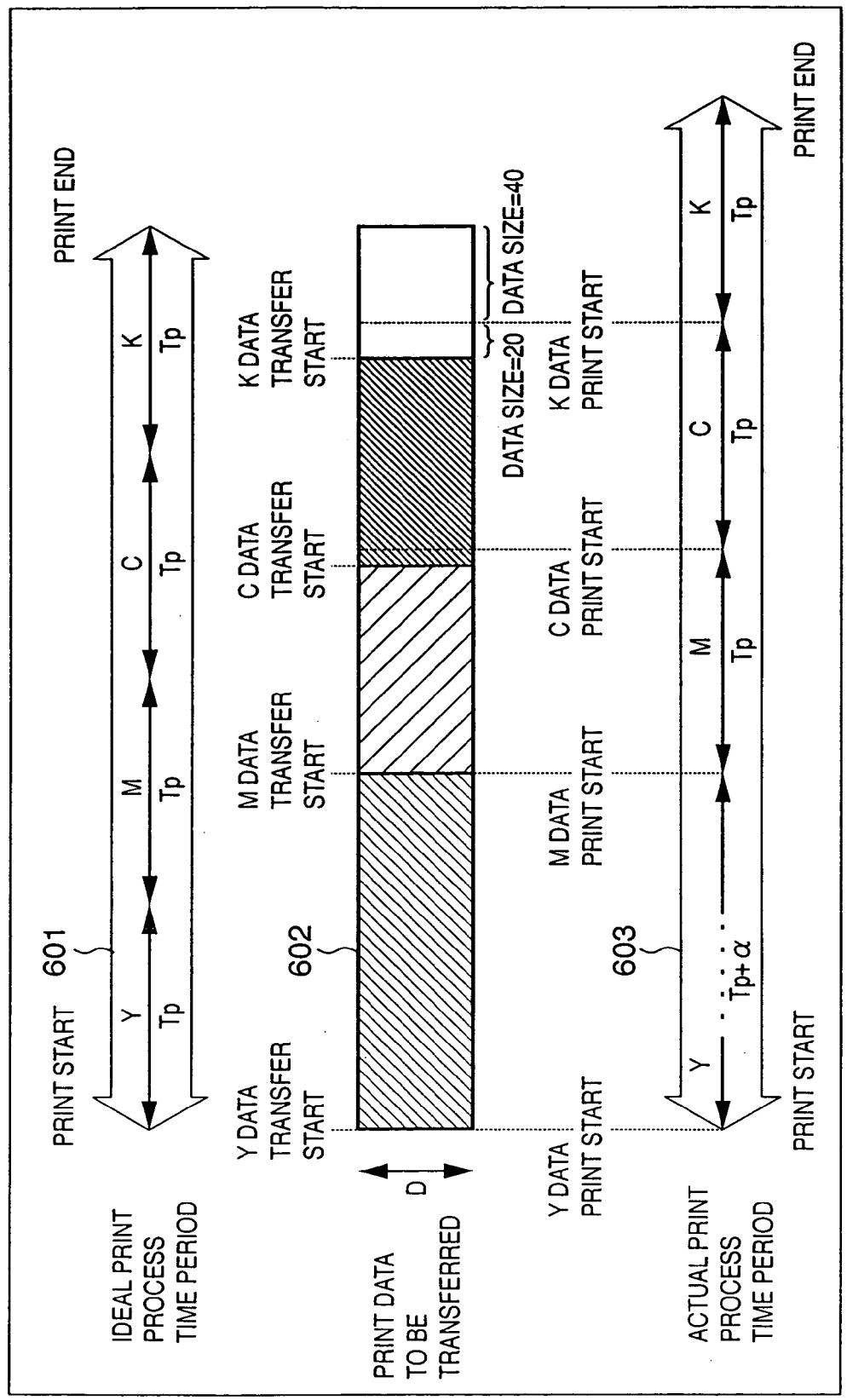
FIG. 6 is a view showing a delay state upon executing a print process by a conventional method.

FIG. 6 is a schematic view of processes when a print process is done at a print start instruction timing obtained by the conventional print processing method.

Referring to FIG. 6, reference numeral 601 denotes an ideal print process time period from the start to the end of a print process (in FIG. 6, the horizontal direction indicates a time direction). That is, since this embodiment prints four planes (Y, M, C, K) with respect to time period Tp required for the printer to print per plane, an ideal print process time period is 4 Tp.

Reference numeral 602 denotes print data to be transferred: the abscissa plots the time period, and the ordinate plots the data transfer rate (=D). That is, the area of a rectangle indicated by 602 amounts to the data size that can be transferred within a predetermined period of time.

As has been described in the description of the prior art, in the conventional print processing method, the print start timing is calculated based on only the relationship between the total data size of print data to be transferred and the plane transfer size. In case of this embodiment, since the total data size is 160+90+90+60=400, the plane transfer size is 100, and the total plane transfer size for four planes is 400, the total data size becomes equal to the total plane transfer size. For this reason, according to the conventional print processing method, it is determined that the print start instruction need only be issued simultaneously with start of data transfer.

However, when a print start instruction of Y data (Yellow data) is issued simultaneously with start of transfer of Y data, as shown in FIG. 6, the printer can print Y data (one plane) within time period Tp, but data for only 100 can be transferred during Tp. Hence, the printer must interrupt the print process and wait until transfer of the data size (160) of Y data is completed (α of Tp+α in 603 of FIG. 6 corresponds to this wait time). That is, the print process time period from the start to the end of the print process requires 4 Tp+α, and it increases. As a result, the time period from the start to the end of the print process cannot fall within a predetermined period of time. A printing apparatus that adopts an electrophotography system is premised on that print data has already been prepared, and some apparatuses cannot wait for an image forming process during a period from the start to the end of a print process. For this reason, the print process result of the condition shown in FIG. 6 is a failure.

In case of this embodiment, there is no delay factor in data transfer other than Yellow. That is, when a Magenta print process starts upon completion of the Yellow print process, Magenta data transfer starts simultaneously with the start of the Magenta print process, thus generating no delay time upon starting the print process. Also, since the plane transfer size is 100, data transfer of Magenta data (data size=90) can be completed during time period Tp required to print Magenta data (1 plane). Hence, data transfer of all required Magenta data is completed during the Magenta print process, thus generating no delay time. As for Cyan, no delay time is generated as in Magenta.

Furthermore, when a Black print process starts simultaneously with completion of the Cyan print process, Black data (data size=20) has already been transferred. Furthermore, since the plane transfer size is 100, the remaining data (data size=40) can be received during time period Tp required to print Black (one plane).

As described above, according to the conventional method, since the total data size of print data is 400, it is determined that the print start timing can be set simultaneously with the start of data transfer. As a result, a delay time is generated in the Yellow print process, and the total print process time period from the start to the end of the print process exceeds an ideal print process time period (4 Tp).

By contrast, according to the print start timing obtained by the print processing method of this embodiment, a constant print process time period (4 Tp) from the start to the end of a print process can be maintained.

DelaySize[1]=PlaneSize[1]−plane transfer size=60 in step S407 in FIG. 4, and MaxDelaySize=60 in step S408.

Furthermore, in step S409 DelaySize[2]=DelaySize[1]+PlaneSize[2]−plane transfer size=60 +90−100=50. In step S410, Max(MaxDelaySize, DelaySize[2])=Max(60, 50)=60.

When DelaySize[3] and DelaySize[4] are similarly calculated, MaxDelaySize=60 is finally calculated.

As a result, according to the print processing method of this embodiment, it is determined that the print process time period can be maintained constant when the print process starts after Yellow data for a data size=60 is transferred.

Figure 7:
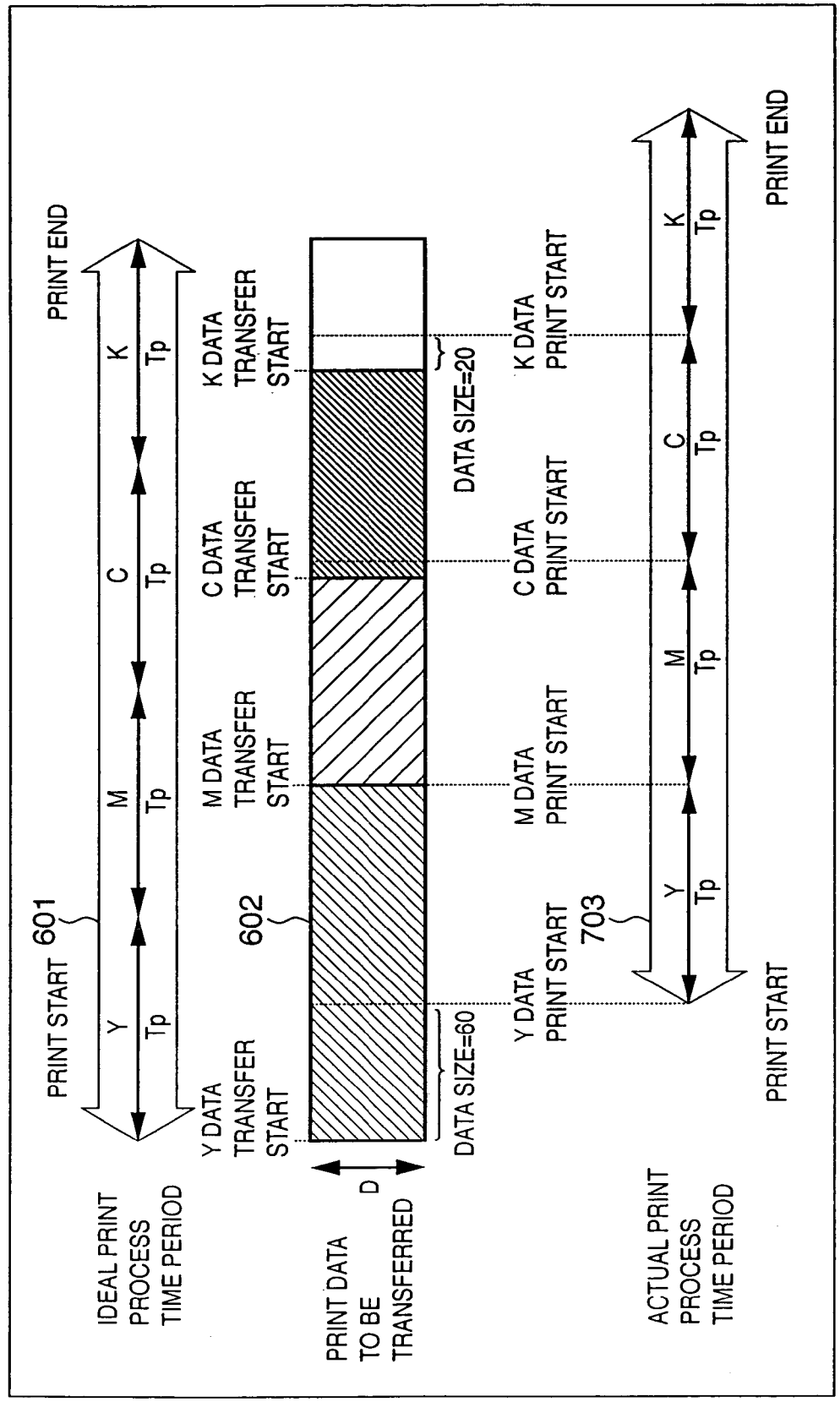
FIG. 7 is a view showing a processing state upon executing a print process of embodiment 1.

FIG. 7 is a schematic view showing of processes when the print start instruction is issued after Yellow data for a data size=60 is transferred. As can be seen from 602 and 703 in FIG. 7, since Yellow data for a data size=60 has already been transferred, full Yellow data (160) can be transferred until time period Tp required to print Yellow (one plane) elapses. Hence, a print process can be done without any delay time.

Upon starting a print process of Magenta (one plane), since Magenta data transfer has already been started, the print process can similarly start without any delay time. Since Magenta data transfer is complete before time period Tp required to print Magenta elapses, no delay time is generated. Furthermore, the same result can be obtained for Cyan.

Furthermore, when a Black print process starts simultaneously with completion of the Cyan print process, Black data (data size=20) has already been transferred. Furthermore, since the data size that can be transferred until time period Tp required to print Black (one plane) elapses is 100, the remaining data (data size=40) can be received during time period Tp required to print Black (one plane).

As described above, according to the print processing method of this embodiment, since a print start instruction can be issued at an appropriate timing, the print processing time period from the start to the end of a print process can become an ideal print process time (4 Tp).

Embodiment 2

According to the print processing method of this embodiment, even when a specific plane has a large data size as in embodiment 1, an optimal print start instruction timing that can assure a constant print process time period can be calculated. However, the print processing method of this embodiment is not limited to such specific feature. For example, when there are two print data, which are respectively formed of planes having the same data sizes, but have different transfer orders (plane orders), optimal print start instruction timings that can assure a constant print process time period can be set for these prints. In this embodiment, a case that can clarify such feature will be explained.

As in embodiment 1, in this embodiment, let Tp be the time required for the printer to print per plane, and D be the data transfer rate. Also, the plane transfer size (i.e., Tp×D) =100 (note that a description of units will be omitted hereinafter for the sake of simplicity).

Each of two image data is formed of Yellow, Magenta, Cyan, and Black colors, and the plane sizes and plane orders of these image data are as follows (data 1 and 2 have the same plane sizes but different plane orders).

(Data 1)
PlaneSize[1] (=Yellow)=160
PlaneSize[2] (=Magenta)=90
PlaneSize[3] (=Cyan)=90
PlaneSize[4] (=Black)=130
(Data 2)
PlaneSize[1] (=Yellow)=160
PlaneSize[2] (=Magenta)=90
PlaneSize[3] (=Black)=130
PlaneSize[4] (=Cyan)=90

Figure 8:
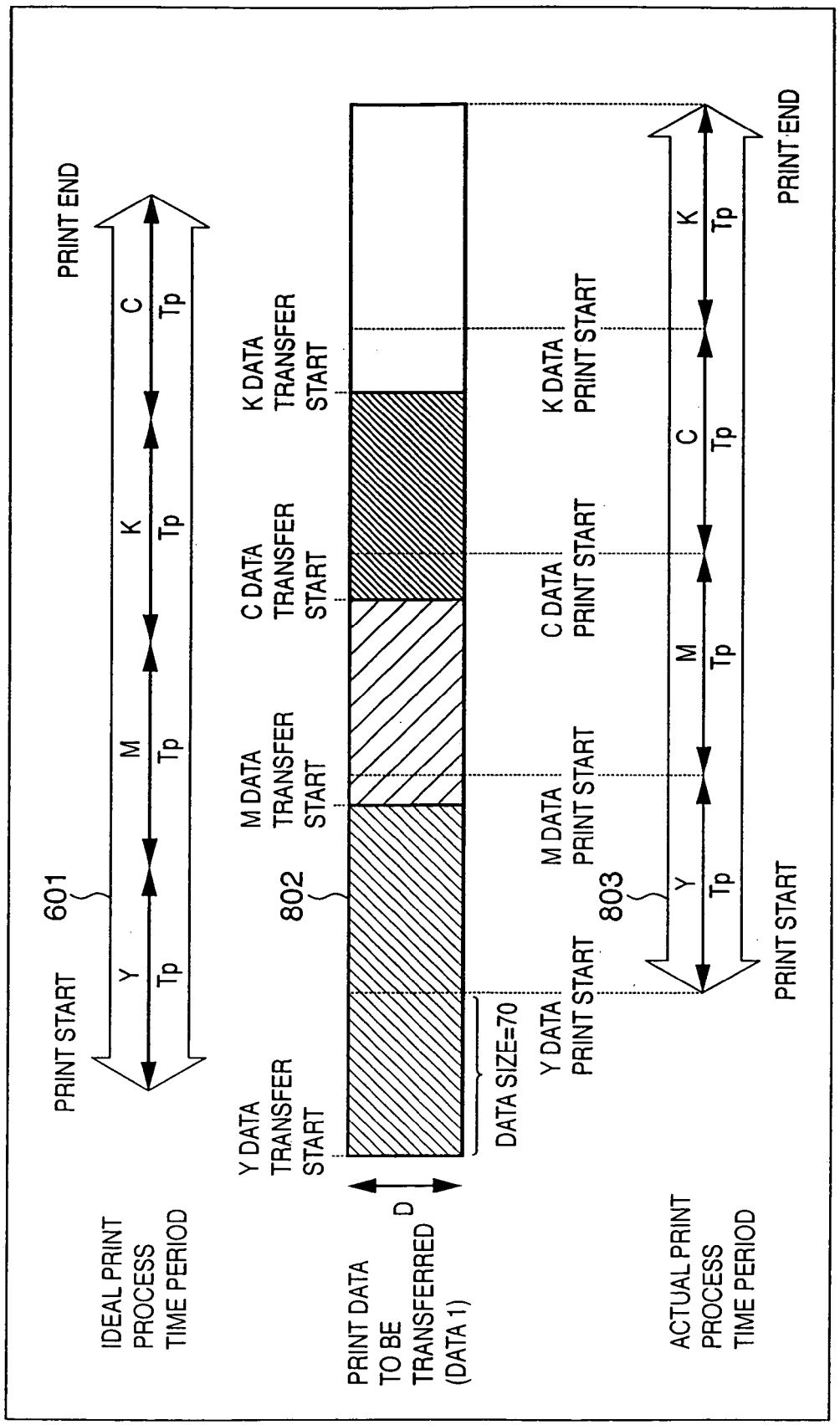
FIG. 8 is a view showing a processing state upon executing a print process of embodiment 2.

FIG. 8 is a schematic view of processes when a print process is done at a print start instruction timing obtained for data 1 by the print processing method of this embodiment under the above preconditions.

Upon calculating MaxDelaySize according to the flow chart of FIG. 4 as in embodiment 1, MaxDelaySize=70 is finally calculated.

Hence, when a print start instruction is issued after Yellow data for a data size=70 of data 1 is transferred, a constant print process time period can be maintained, as shown in 802 and 803 in FIG. 8.

Figure 9:
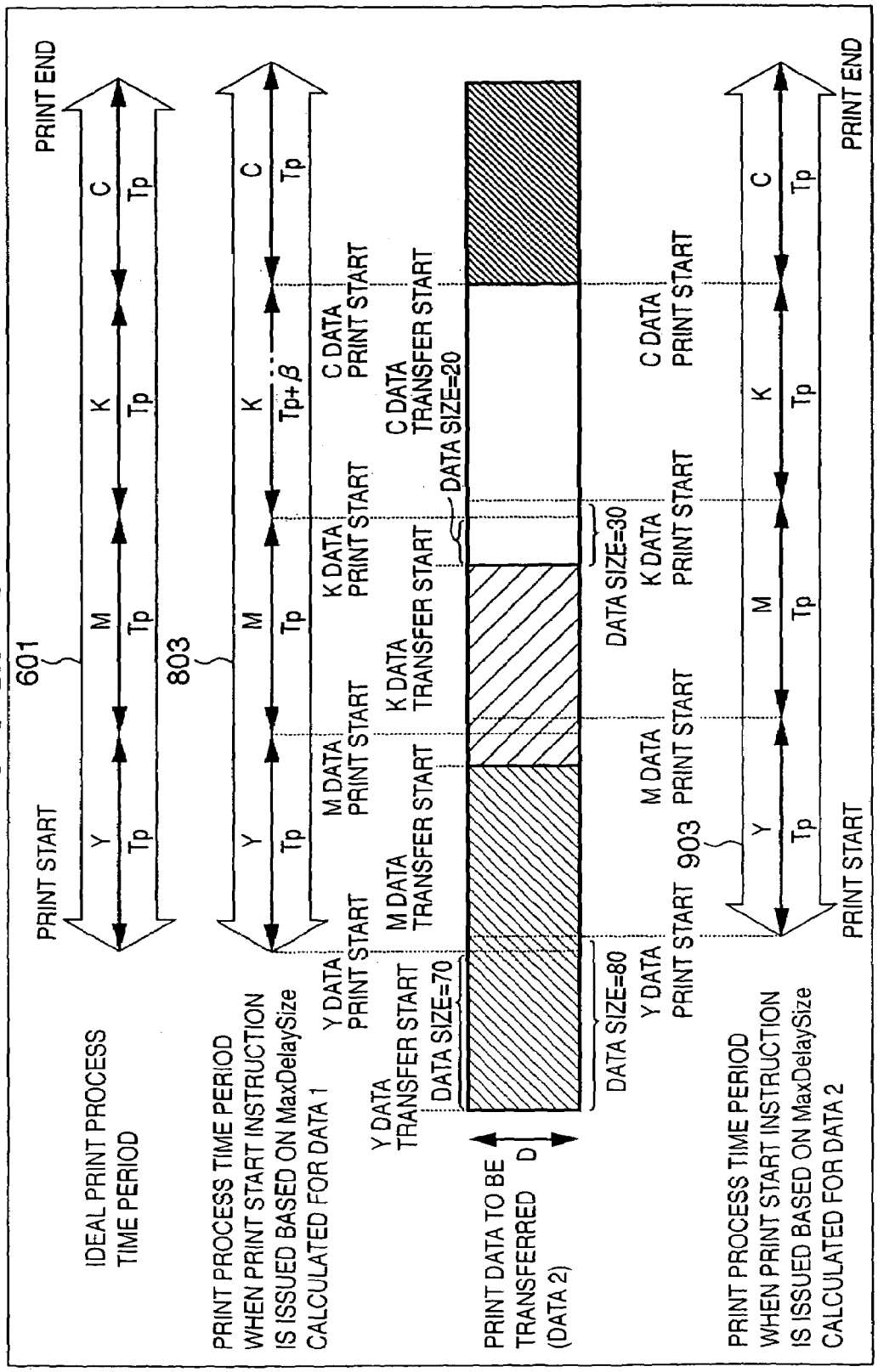
FIG. 9 is a view showing a processing state upon executing a print process of embodiment 2.

On the other hand, FIG. 9 is a schematic view of processes when a print process is done at a print start instruction timing obtained for data 2 by the print processing method of this embodiment under the above preconditions. FIG. 9 also shows an ideal print process time 601 and a print process time 803 obtained when a print start instruction is issued based on MaxDelaySize calculated for data 1, so as to clarify the difference.

Data 1 and 2 have the same plane data sizes but different plane orders. However, as can be seen from 803, when a print start instruction is issued based on MaxDelaySize calculated for data 1, a constant print process time cannot be maintained for data 2.

That is, when a print start instruction is issued after Yellow data for a data size=70 is transferred, Y and M data print processes can be executed without any delay time, but a delay time is generated in a K data print process.

At the beginning of the K data print process, a part (data size=20) of K data has already been transferred. However, K data for only a data size=100 is transferred from the beginning of the K data print process until time period Tp elapses (until the K data print process is completed), but full data (data size=130) cannot be transferred. For this reason, the K data print process is interrupted and waits for data, thus generating a delay time (consequently, a print process time period is 4 Tp+β). In case of a print apparatus which cannot wait, the print process fails, as has been explained in embodiment 1.

By contrast, when a print start instruction is issued based on MaxDelaySize calculated for data 2 (MaxDelaySize=80 as a result of the process according to the flow chart of FIG. 4), as shown in 903, a constant print process time period can be maintained. That is, since a print start instruction is issued after Yellow data for a data size=80 is transferred, K data for a data size=30 has already been transferred at the K data print start timing. For this reason, K data for another data size=100 is transferred from the beginning of the K data print process until time period Tp elapses (until the K data print process is completed), and full data (data size=130) can be transferred. For this reason, no delay time is generated upon printing K data, and the print process can be done within an ideal print process time period (4 Tp). In other words, even in a printing apparatus which is premised on that print data has already been prepared, and does not or cannot wait an image forming process during the period from the start to the end of the print process, a print process can be completed normally.

As can be seen from the description of embodiments 1 and 2, the print start instruction timing obtained by the print processing method according to the embodiment fulfills the following required conditions. That is, when a print start instruction is issued at that print start instruction timing, (i) data transfer of a predetermined plane has already been started or is started simultaneously at the beginning of a print process of that plane;

(ii) data transfer of the predetermined plane is complete or completed simultaneously at the end of the print process of that plane; and (iii) required conditions (i) and (ii) are fulfilled in the print processes of respective planes which form print data.

Since these required conditions are fulfilled, an appropriate print start instruction timing, which can maintain a constant print process time period even for color print data for which a constant print process time period from the start to the end of a print process cannot be maintained at a print start instruction timing obtained based on the print processing method, can be calculated.

Furthermore, according to the print processing method of this embodiment, even when the transfer order (plane order) of print data consisting of a plurality of planes is changed, an appropriate print start instruction timing can be calculated.

As can be seen from the above description, according to this embodiment, since an information processing apparatus, which is connected to an output apparatus that executes an output process of print data of a plurality of color planes, issues a print start instruction at an appropriate timing that considers the print data sizes for respective color planes, a normal print result can be obtained even for print data of a plurality of color planes.

Embodiment 3

In embodiments 1 and 2, the information processing apparatus connected to the printing apparatus determines a print start instruction timing. However, the present invention is not limited to such specific arrangement. For example, the printer may execute some steps of processes of embodiments 1 and 2.

That is, the calculation result according to the flow chart of FIG. 3 which is executed by the host computer (information processing apparatus) is sent to the printer, which executes the flow charts of FIGS. 4, 5A, and 5B on the basis of the received calculation result. In this case, assume that the printer stores a plane transfer size in advance. For example, the printer may calculate the plane transfer size on the basis of a transfer rate notified from the host computer, the color engine speed of the self apparatus, and the number of color planes.

The flow charts of FIGS. 5A and 5B can be explained as processes between the control circuit 31 and printer engine 35 in FIG. 2.

That is, the processes of respective steps can be explained while considering the control circuit 31, which serves as a printer controller, as the host computer 101, and the printer engine 35 (including an engine control circuit; not shown) as the printer 107.

However, the process in step S520 is modified as a process of the control circuit 31 with contents "image data size that has already been received from host computer 101>MaxDelaySize".

According to embodiment 3, even when the host computer does not recognize engine speeds of a plurality of printers and the like, an appropriate print start timings can be effectively determined.

Another Embodiment

The present invention may be applied to either a system constituted by a plurality of devices, or an apparatus consisting of a single equipment. The present invention is also achieved by executing a program code of software that implements the functions of the aforementioned embodiments and is downloaded via a network or supplying a recording medium that stores the program code to a system or apparatus, and reading out and executing the supplied program code by a computer (or a CPU or MPU) of that system or apparatus.

In this case, the program code itself read out from the recording medium implements the functions of the above-mentioned embodiments, and the recording medium which stores the program code constitutes the present invention.

As the recording medium for supplying the program code, for example, a floppy disk®, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS or the like running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the recording medium is written in a memory of the extension board or unit.

The present invention is not limited to the aforementioned embodiments, and various changes and modifications of the invention are available. Therefore, the technical scope of the present invention is determined based on the scope of the appended claims.

INDUSTRIAL APPLICABILITY

As described above, according to the present invention, in a print system which comprises an output apparatus that executes an output process of print data of a plurality of color planes, and an information processing apparatus connected to the output apparatus, since a print start instruction is issued at an appropriate timing that considers print data sizes for respective color planes, a normal print result can be obtained even for print data of a plurality of color planes.

The invention claimed is:

1. An information processing apparatus for controlling an output unit that outputs color print data including a plurality of color data, and transfers respective color data to the output unit in a predetermined order, comprising:
   a specifying unit adapted to specify data sizes of the respective color data to be transferred;
   a determination unit adapted to determine a print start instruction timing for color data to be first printed, on the basis of the specified data sizes of the respective color data in accordance with the predetermined order, and a plane transfer size as a data size that can be transferred to the output unit during output of one page per color data; and
   an instruction unit adapted to issue a print start instruction to the output unit at the determined timing.

2. The apparatus according to claim 1, wherein said determination unit specifies a maximum value upon summing up differences between the specified data sizes of respective colors and the plane transfer size in the order of data transfer of the respective colors, and determines the timing to delay the print start instruction by a time period required to transfer a data size of the maximum value from the beginning of transfer of the color print data.

3. The apparatus according to claim 1, wherein said determination unit determines the timing for each page of the color print data to be output.

4. The apparatus according to claim 1, wherein the respective colors include four colors Y, M, C, and K, and data transfer is made in an order of Y, M, C, and K.

5. The apparatus according to claim 1, wherein said instruction unit is adapted to issue a print start instruction to the output unit at the determined timing after the color print data to be output is transferred to the output unit.

6. The apparatus according to claim 1, wherein the apparatus is a host computer which can transfer color print data to an output apparatus comprising the output unit via a communication line.

7. A print processing method for controlling an output unit that outputs color print data including a plurality of color data, and transfers respective color data to the output unit in a predetermined order comprising:
   a specifying step of specifying data sizes of the respective color data to be transferred;
   a determination step of determining a print start instruction timing for color data to be first printed, on the basis of the specified data sizes of the respective color data in accordance with the predetermined order, and a plane transfer size as a data size that can be transferred to the output unit during output of one page per color data; and
   an instruction step of issuing a print start instruction to the output unit at the determined timing.

8. The method according to claim 7, wherein said determination step includes a step of specifying a maximum value upon summing up differences between the specified data sizes of respective colors and the plane transfer size in the order of data transfer of the respective colors, and determining the timing to delay the print start instruction by a time period required to transfer a data size of the maximum value from the beginning of transfer of the color print data.

9. The method according to claim 7, wherein said determination step includes a step of determining the timing for each page of the color print data to be output.

10. The method according to claim 7, wherein the respective colors include four colors Y, M, C, and K, and data transfer is made in an order of Y, M, C, and K.

11. A control program for making a computer implement a print processing method of claim 7.

12. A recording medium storing a control program for making a computer implement a print processing method of claim 7.

13. The method according to claim 7, wherein said instruction step includes issuing a print start instruction to the output unit at the determined timing after the color print data to be output is transferred to the output unit.

14. The method according to claim 7, wherein the apparatus is a host computer which can transfer color print data to an output apparatus comprising the output unit via a communication line.

15. An information processing apparatus for generating color print data according to application data, and outputting the generated color print data to an output apparatus, comprising:
   a specifying unit adapted to specify data sizes of the respective color data which form one page of color print data to be output to the output apparatus;
   a determination unit adapted to determine the timing, at which a print start instruction is to be issued to the output apparatus, on the basis of the specified data sizes of the respective color data, and a plane transfer size as a data size that can be transferred to the output apparatus during output of one page per color data; and
   an instruction unit adapted to issue a print start instruction to the output apparatus at the determined timing.

16. The apparatus according to claim 15, wherein said determination unit specifies a maximum value upon summing up differences between the specified data sizes of respective colors and the plane transfer size in the order of data transfer of the respective colors, and determines the timing to delay the print start instruction by a time period required to transfer a data size of the maximum value from the beginning of transfer of the color print data.

17. A print processing method in an information processing apparatus for generating color print data according to application data, and outputting the generated color print data to an output apparatus, comprising:
   a specifying step, of specifying data sizes of respective color data which form one page of color print data to be output to the output apparatus;
   a determination step of determining the timing at which a print start instruction is to be issued to the output apparatus, on the basis of the specified data sizes of the respective color data, and a plane transfer size as a data size that can be transferred to the output apparatus during output of one page per color data; and
   an instruction step of issuing a print start instruction to the output apparatus at the determined timing.

18. The method according to claim 17, wherein said determination step includes a step of specifying a maximum value upon summing up differences between the specified data sizes of respective colors and the plane transfer size in the order of data transfer of the respective colors, and determining the timing to delay the print start instruction by a time period required to transfer a data size of the maximum value from the beginning of transfer of the color print data.

19. A control program for making a computer implement a print processing method of claim 17.

20. A recording medium storing a control program for making a computer implement a print processing method of claim 17.

* * * * *

UNITED STATES PATENT AND TRADEMARK OFFICE
CERTIFICATE OF CORRECTION

PATENT NO. : 7,265,862 B2
APPLICATION NO. : 10/844410
DATED : September 4, 2007
INVENTOR(S) : Kurihara It is certified that error appears in the above-identified patent and that said Letters Patent is hereby corrected as shown below:

COLUMN 1:
Line 38, "such problem," should read -- such a problem, --; and
Line 61, "in case" should read -- in the case --.

COLUMN 2:
Line 29, "to adapted" should read -- adapted --.

COLUMN 5:
Line 3, "such problem," should read -- such a problem, --; and
Line 50, "Suffices" should read -- Suffixes --.

COLUMN 6:
Line 9, "in case" should read -- in the case --;
Line 15, "in case" should read -- in the case --; and
Line 39, "one of" should read -- one of the --.

COLUMN 7:
Line 18, "In case" should read -- In the case --; and
Line 20, "In case" should read -- In the case --.

COLUMN 10:
Line 9, "colors" should read -- colors: --;
Line 10, "Black," should read -- Black; --;
Line 43, "In case" should read -- In the case --; and
Line 63, "is premised" should read -- that is premised --.

UNITED STATES PATENT AND TRADEMARK OFFICE
CERTIFICATE OF CORRECTION

PATENT NO. : 7,265,862 B2
APPLICATION NO. : 10/844410
DATED : September 4, 2007
INVENTOR(S) : Kurihara It is certified that error appears in the above-identified patent and that said Letters Patent is hereby corrected as shown below:

COLUMN 11:
Line 1, "In case" should read -- In the case --.

COLUMN 13:
Line 3, "In case" should read -- In the case --; and
Line 22, "wait" should read -- await --.

COLUMN 14:
Line 27, "timings" should read -- timing --.

Signed and Sealed this

Twentieth Day of May, 2008

JON W. DUDAS
*Director of the United States Patent and Trademark Office*